United States Patent
Kusu et al.

(10) Patent No.: US 7,331,611 B2
(45) Date of Patent: Feb. 19, 2008

(54) UNDERBODY STRUCTURE OF VEHICLE

(75) Inventors: Hirotaka Kusu, Fuchu-cho (JP);
Fumio Okana, Fuchu-cho (JP);
Noritaka Sakiyama, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 173 days.

(21) Appl. No.: 11/151,400

(22) Filed: Jun. 14, 2005

(65) Prior Publication Data
US 2006/0087109 A1    Apr. 27, 2006

(30) Foreign Application Priority Data

| Jun. 30, 2004 | (JP) | ............................. 2004-192476 |
| Jun. 30, 2004 | (JP) | ............................. 2004-192477 |
| Jul. 8, 2004 | (JP) | ............................. 2004-201295 |
| Jul. 8, 2004 | (JP) | ............................. 2004-201296 |

(51) Int. Cl.
*B62D 25/20* (2006.01)

(52) U.S. Cl. ...................................... 280/834; 180/309

(58) Field of Classification Search ................ 280/830, 280/834, 309
See application file for complete search history.

(56) References Cited

U.S. PATENT DOCUMENTS

| 4,723,810 | A | | 2/1988 | Kanemaru et al. |
| 5,364,128 | A | | 11/1994 | Ide |
| 5,409,264 | A | * | 4/1995 | Nakatani ..................... 280/834 |
| 5,560,651 | A | | 10/1996 | Kami et al. |
| 6,824,168 | B2 | * | 11/2004 | Kawazu et al. ............. 280/834 |
| 6,953,099 | B2 | * | 10/2005 | Kawasaki et al. ......... 180/65.1 |
| 6,983,945 | B2 | * | 1/2006 | Kawasaki et al. ......... 280/834 |
| 7,040,432 | B2 | * | 5/2006 | Kawasaki et al. ......... 180/65.1 |
| 7,073,824 | B2 | * | 7/2006 | Uhara et al. ................ 280/834 |
| 2003/0047932 | A1 | | 3/2003 | Kawazu et al. |
| 2006/0289224 | A1 | * | 12/2006 | Ono et al. .................. 180/311 |

FOREIGN PATENT DOCUMENTS

| JP | 05-050952 | 3/1993 |
| JP | 05-155258 | 6/1993 |
| JP | 05-071083 | 9/1993 |

OTHER PUBLICATIONS

European Search Report dated Oct. 18, 2005.

* cited by examiner

*Primary Examiner*—Kevin Hurley
(74) *Attorney, Agent, or Firm*—Nixon Peabody LLP; Donald R. Studebaker

(57) ABSTRACT

An underbody structure of a vehicle includes a floor panel of which rear portion is raised to form a rear floor, a pair of left and right rear side frames extending generally along a longitudinal axis of the vehicle at the rear of the floor panel with a specific distance held between the left and right rear side frames across the vehicle, and a rear cross member extending widthwise across the vehicle and interconnecting forward end portions of the left and right rear side frames. A fuel tank is mounted between the left and right rear side frames, and the rear cross member is located under the floor panel at the front of the fuel tank.

12 Claims, 14 Drawing Sheets

UNDERBODY STRUCTURE OF VEHICLE

BACKGROUND OF THE INVENTION

1. Field of the Invention

The present invention relates to an underbody structure of a vehicle including a pair of left and right rear frames located at the rear of a floor panel, the left and right rear frames being separated from each other by a specific distance across the vehicle with a fuel tank disposed between the two rear frames.

2. Description of the Related Art

FIG. 16 shows a typical example of an underbody structure conventionally employed in a vehicle.

Referring to FIG. 16, the conventional underbody structure of includes a rear floor 102 which is connected a floor panel 100 via a kick-up part 101 formed by raising a rear portion of the floor panel 100. The underbody structure further includes a rear cross member 103 installed at the rear of an upper portion of the kick-up part 101 under a forward portion of the rear floor 102, the rear cross member 103 extending widthwise across the vehicle. A fuel tank 104 is installed at the rear of the rear cross member 103 and a rear seat 105 is mounted above the rear floor 102.

While the rear cross member 103 serves to enhance the stiffness of the vehicle body and to protect the fuel tank 104 from a side impact load, the rear cross member 103 is installed at an undesirable location from a viewpoint of seating comfort and the capacity of the fuel tank 104 in the conventional underbody structure.

Generally, there are sometimes conflicting requirements in vehicle design. One of these requirements is to make adequate leg space available for rear-seat passengers by installing the rear seat 105 and the kick-up part 101 at as rear a location as possible, providing thereby improved ride comfort, and another is to make the capacity of the fuel tank 104 as large as possible. It is necessary to position the kick-up part 101 at as rear a location as possible for providing improved ride comfort. On the other hand, it is necessary to extend the fuel tank 104 frontward for increasing the capacity of the fuel tank 104. Therefore, a vehicle body structure must generally be designed by taking different approaches to meet these conflicting requirements at the same time. If the vehicle must have a compact body, there arises an additional requirement that the amount of any overhang in a rear part of the vehicle must be made small. It is difficult to meet this requirement, however, if the rear cross member 103 is located at the rear of the upper portion of the kick-up part 101 as shown in FIG. 16.

Japanese Unexamined Patent Publication No. 1993-50952 discloses an arrangement in which a rear cross member is provided on an upper portion of a rear side of a kick-up part, and a fuel tank is located between left and right rear side frames which are provided at the rear of the rear cross member. If the rear cross member is located at the front of the fuel tank, however, there arises a problem that the presence of the rear cross member makes it difficult to provide improved ride comfort and increase the capacity of the fuel tank as in the structure of FIG. 16.

Also, Japanese Laid-open Utility Model Publication No. 1993-71083 proposes an arrangement in which a fuel tank is located at a kick-up part. The arrangement of this prior art Publication is not intended to provide improved ride comfort and increase the capacity of the fuel tank, however.

Furthermore, Japanese Unexamined Patent Publication No. 1993-155258 shows an arrangement in which a fuel tank is formed to fit the shape of a rear side of a kick-up part and mounted immediately along the rear side of the kick-up part. This approach however has a problem that the proposed fuel tank design is too complicated and unfeasible from a viewpoint of practical application.

SUMMARY OF THE INVENTION

In light of the foregoing, it is an object of the invention to provide an underbody structure of a vehicle including a pair of left and right rear frames and a cross member extending widthwise across the vehicle to connect forward end portions of the left and right rear frames to each other, the cross member being located under a floor panel at the front of a fuel tank, whereby the underbody structure provides adequate stiffness of the vehicle body and an increased capacity of the fuel tank.

In one principal form of the invention, an underbody structure of a vehicle includes a floor panel, a pair of left and right rear frames extending generally along a longitudinal axis of the vehicle at the rear of the floor panel with a specific distance held between the left and right rear frames across the vehicle, and a cross member extending widthwise across the vehicle and interconnecting forward end portions of the left and right rear frames. In this underbody structure, a fuel tank is mounted between the left and right rear frames, and the cross member is located under the floor panel at the front of the fuel tank.

In the underbody structure thus constructed, the aforementioned cross member interconnects the forward end portions of the left and right rear frames across the vehicle, serving thereby to provide adequate stiffness of the vehicle body. In addition, since the aforementioned cross member is located under the floor panel at the front of the fuel tank, the underbody structure of the invention makes it possible to increase the capacity of the fuel tank compared to the earlier-described conventional underbody structure in which the cross member is installed at the rear of an upper portion of the kick-up part. Therefore, the underbody structure of the invention can satisfy the conventionally conflicting requirements for enhanced vehicle body stiffness and an increased fuel tank capacity at the same time. Furthermore, since the aforementioned cross member is located under the floor panel, the presence of the cross member does not adversely affect the vehicle interior in any way.

These and other objects, features and advantages of the invention will become more apparent upon reading the following detailed description along with the accompanying drawings.

DETAILED DESCRIPTION OF THE PREFERRED EMBODIMENTS OF THE INVENTION

Generally, the present invention achieves the aforementioned object thereof with an underbody structure of a vehicle which includes a pair of left and right rear frames and a cross member extending widthwise across the vehicle to connect forward end portions of the left and right rear frames to each other, the cross member being located under a floor panel at the front of a fuel tank. The underbody structure of the invention provides adequate stiffness of the vehicle body and an increased capacity of the fuel tank.

A specific embodiment of the invention is now described in detail with reference to the appended drawings in which arrows marked by the letter F indicate a forward direction of a vehicle and arrows marked by the letter R indicate a rearward direction of the vehicle.

Figure 1:
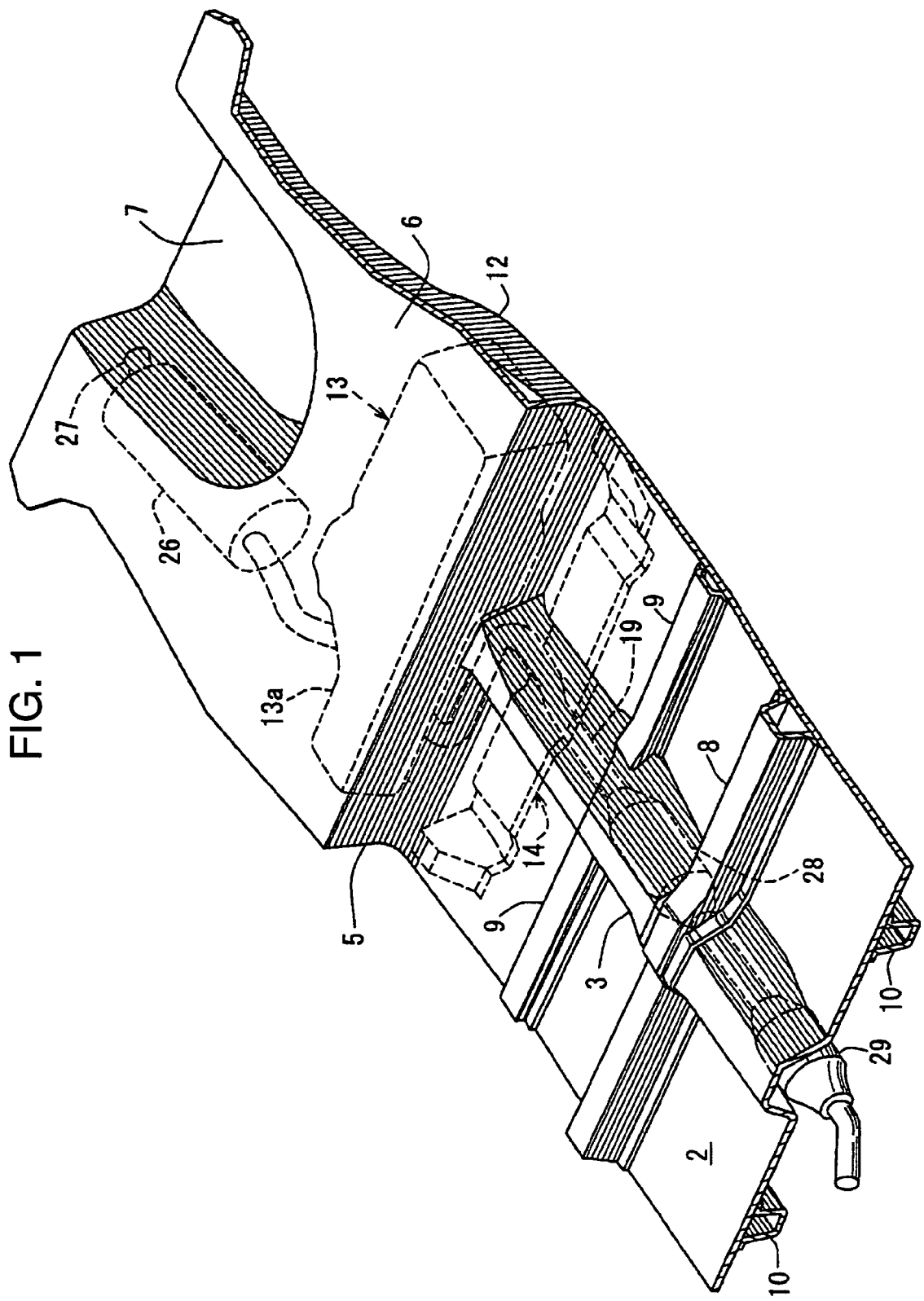
FIG. 1 is a perspective view of the underbody structure according to an embodiment of the invention.
Figure 2:
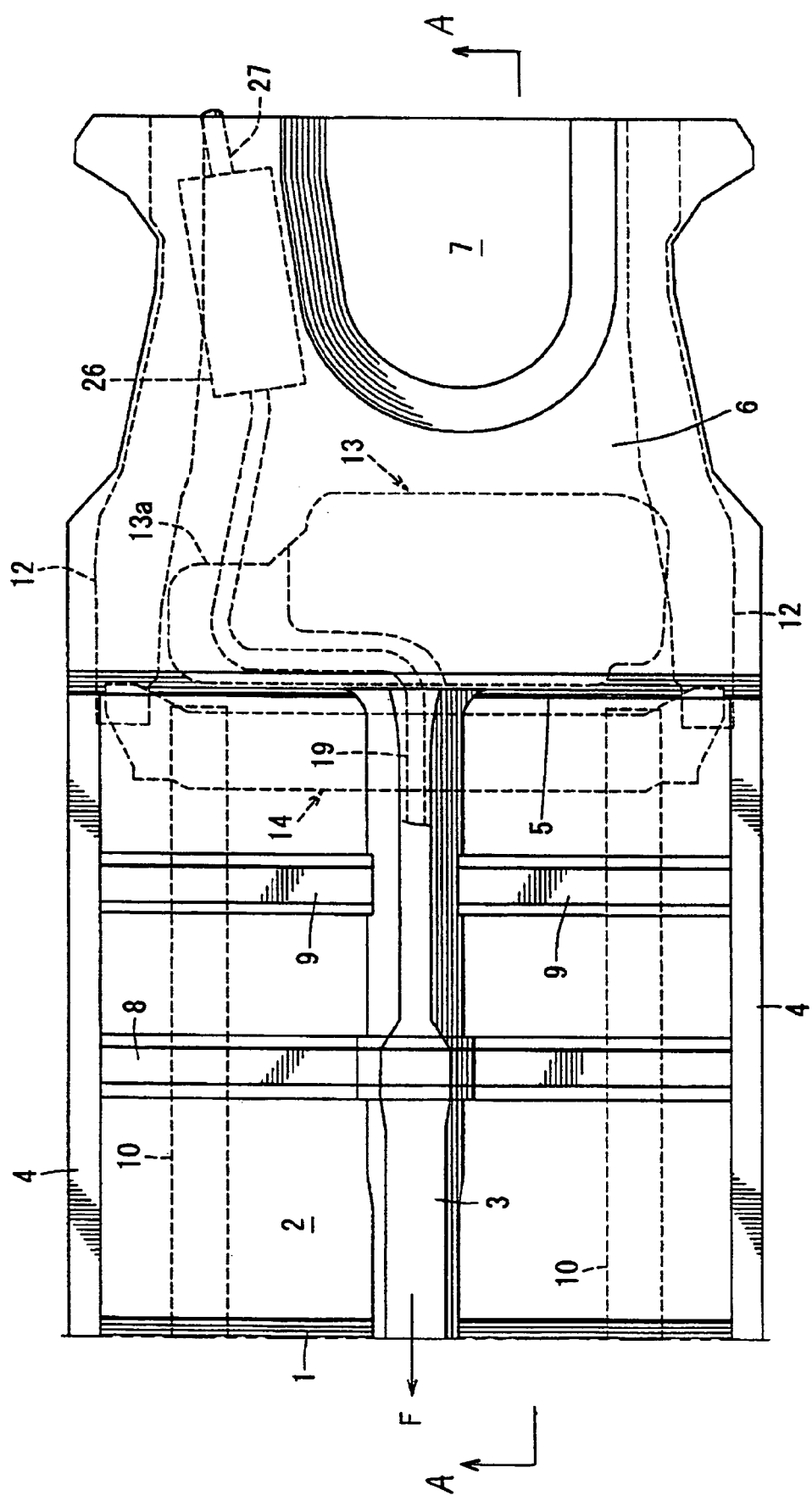
FIG. 2 is a plan view of the underbody structure.
Figure 3:
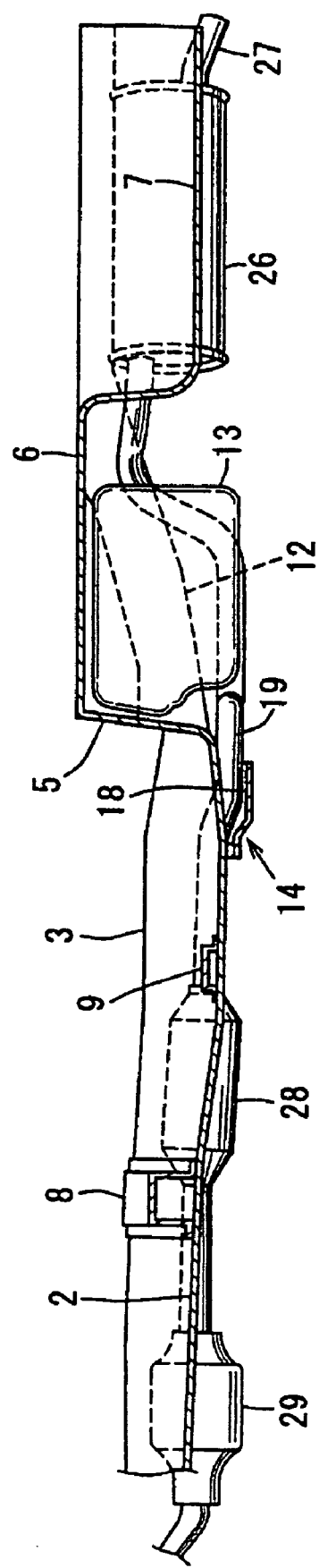
FIG. 3 is a cross-sectional view of the underbody structure taken along lines A-A of FIG. 2.
Figure 4:
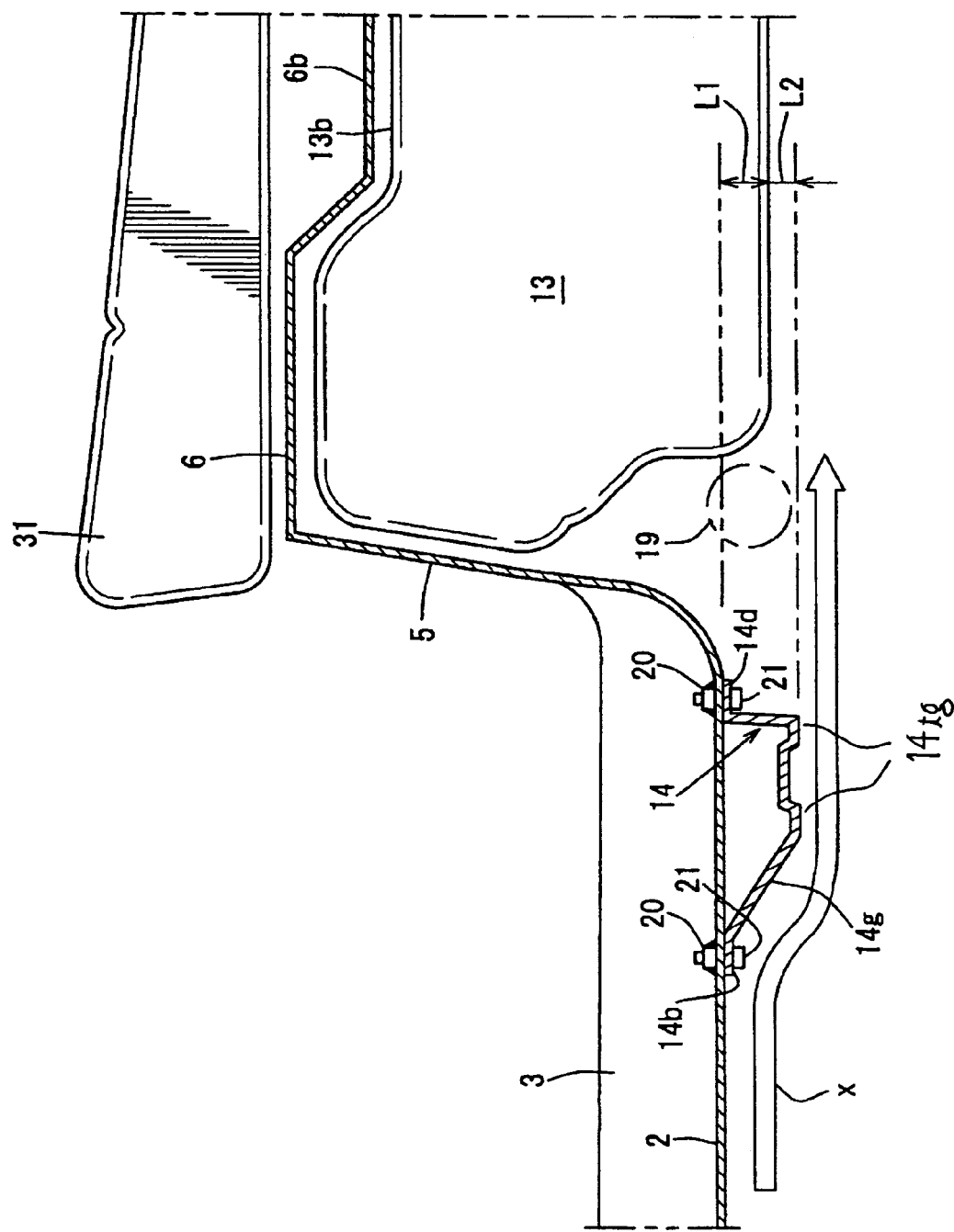
FIG. 4 is an enlarged side view showing a principal part of the underbody structure.
Figure 5:
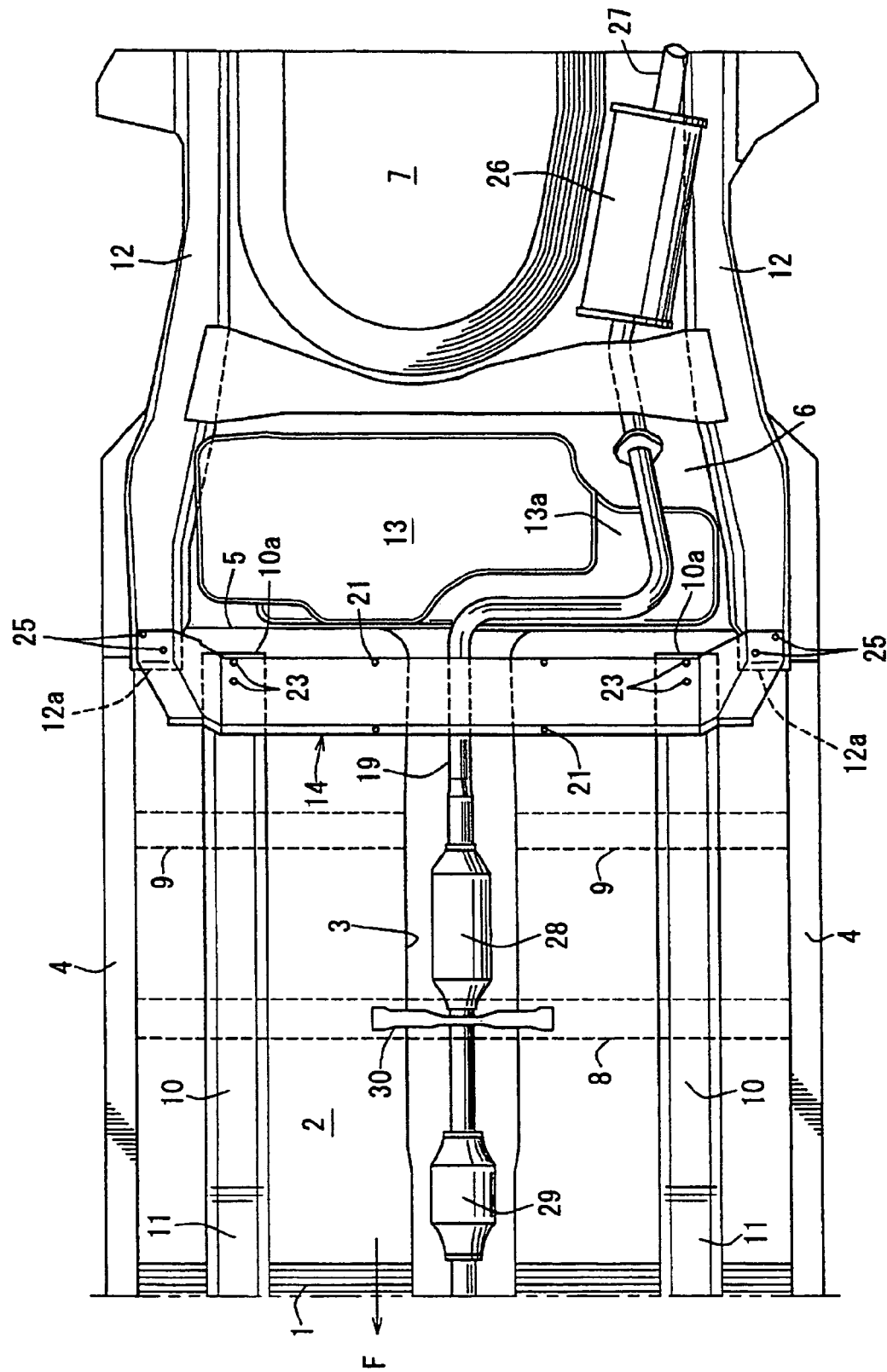
FIG. 5 is a bottom view of the underbody structure.

FIGS. 1 to 5 are diagrams showing an underbody structure of the vehicle according to the embodiment of the invention, in which FIG. 1 is a perspective view of the underbody structure, FIG. 2 is a plan view of the underbody structure, FIG. 3 is a cross-sectional view of the underbody structure taken along lines A-A of FIG. 2, FIG. 4 is an enlarged side view showing a principal part of the underbody structure, and FIG. 5 is a bottom view of the underbody structure. Referring to these Figures, the underbody structure of the vehicle includes a lower dash panel (dash panel) 1 serving as a partition for separating a passenger compartment from an engine room at the front, a floor panel 2 integrally formed with the lower dash panel 1, extending generally horizontally rearward from a lower rear end of the lower dash panel 1, and a tunnel 3 bulging upward into the passenger compartment from the floor panel 2 along a centerline thereof, the tunnel 3 running parallel to a longitudinal axis of the vehicle.

Left and right side sills 4 serving as body stiffening members extending along the longitudinal axis of the vehicle are firmly fixed to both sides of the floor panel 2. Each of these side sills 4 is made by joining a side sill inner plate, a side sill outer plate and side sill reinforcement plate which together form an elongate member having a closed cross section extending along the longitudinal axis of the vehicle.

A rear portion of the floor panel 2 is raised to form a kick-up part 5. A rear floor 6, which constitutes an integral part of the floor panel 2, further extends rearward from an upper end of the kick-up part 5, and approximately the middle of a rear portion of the rear floor 6 is recessed downward, forming a spare tire pan 7.

As illustrated in FIGS. 1 to 3, there is provided a cross member 8 (which is a so-called No. 2 cross member) serving as a body stiffening member on the floor panel 2, the cross member 8 straddling the tunnel 3 and extending widthwise between the left and right side sills 4. Also provided on the floor panel 2 at a location separated rearward from the cross member 8 is a pair of left and right cross members 9 (which are so-called No. 2.5 cross members) serving as body stiffening members. With the provision of these body stiffening members, there is formed a closed cross section extending widthwise between the cross member 8 and each cross member 9.

On the bottom of the floor panel 2, there is provided a pair of left and right floor frames 10 which serve as body stiffening members. Each of these floor frames 10 runs parallel to the longitudinal axis of the vehicle between the tunnel 3 and one of the side sills 4 as shown in FIG. 5. The two floor frames 10 are firmly fixed to a bottom surface of the floor panel 2, whereby a closed cross section extending along the longitudinal axis of the vehicle is formed between the floor panel 2 and each of the floor frames 10. Rear ends of the floor frames 10 extend up to the proximity of the kick-up part 5. The floor frames 10 connect at forward ends thereof directly to individual front side frames 11 as illustrated.

Further, there is provided a pair of left and right rear side frames 12 which serve as body stiffening members (rear frames) extending generally along the longitudinal axis of the vehicle with a specific distance held between the two rear side frames 12 across the vehicle. These two rear side frames 12 are firmly fixed to the bottom surface of the floor panel 2, whereby a closed cross section extending generally along the longitudinal axis of the vehicle is formed between the floor panel 2 and each of the rear side frames 12.

A fuel tank 13 is mounted between the left and right rear side frames 12 so that the fuel tank 13 is located slightly below the kick-up part 5 at the rear thereof under a forward portion of the rear floor 6 as shown in FIG. 4.

Figure 6:
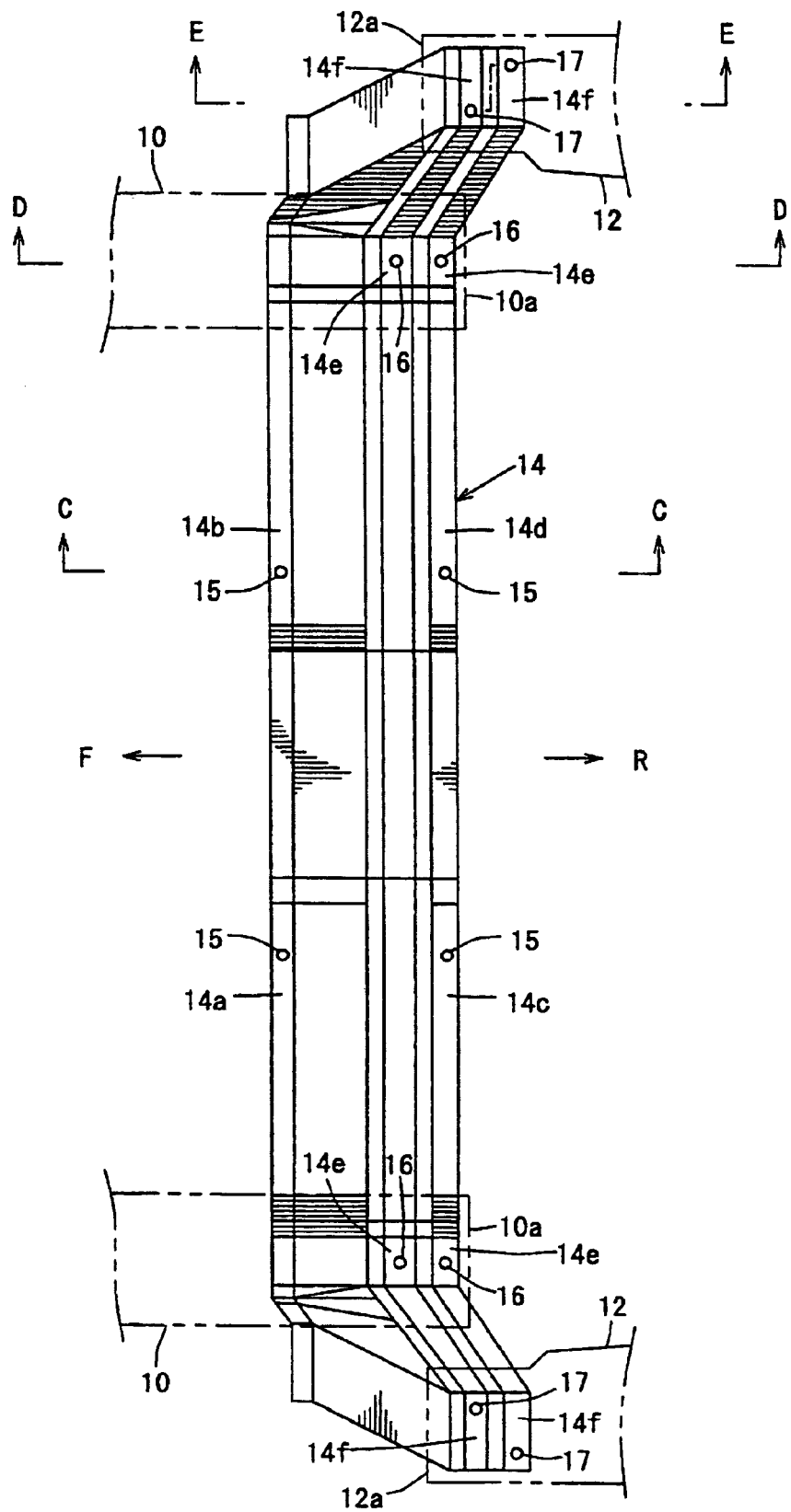
FIG. 6 is a plan view of a rear cross member.

As shown in FIGS. 5 and 6, rear end portions 10a of the left and right floor frames 10 longitudinally extending along the bottom surface of the floor panel 2 are offset widthwise from forward end portions 12a of the left and right rear side frames 12 longitudinally extending along the bottom surface of the floor panel 2 in plan view. However, the rear end portions 10a of the left and right floor frames 10 overlap lengthwise the forward end portions 12a of the left and right rear side frames 12 as illustrated.

FIG. 6 is a plan view of a rear cross member 14 which is installed between the forward end portions 12a of the left and right rear side frames 12, extending widthwise across the vehicle. The rear cross member 14 serving as a body stiffening member interconnects the forward end portions 12a of the left and right rear side frames 12. As shown in FIGS. 1 and 2, the rear cross member 14 is located under the floor panel 2 at the front of the fuel tank 13. The rear cross member 14 is positioned on the underside of the floor panel 2 immediately at the front of the kick-up part 5 as can be seen from FIG. 1.

Figure 7:
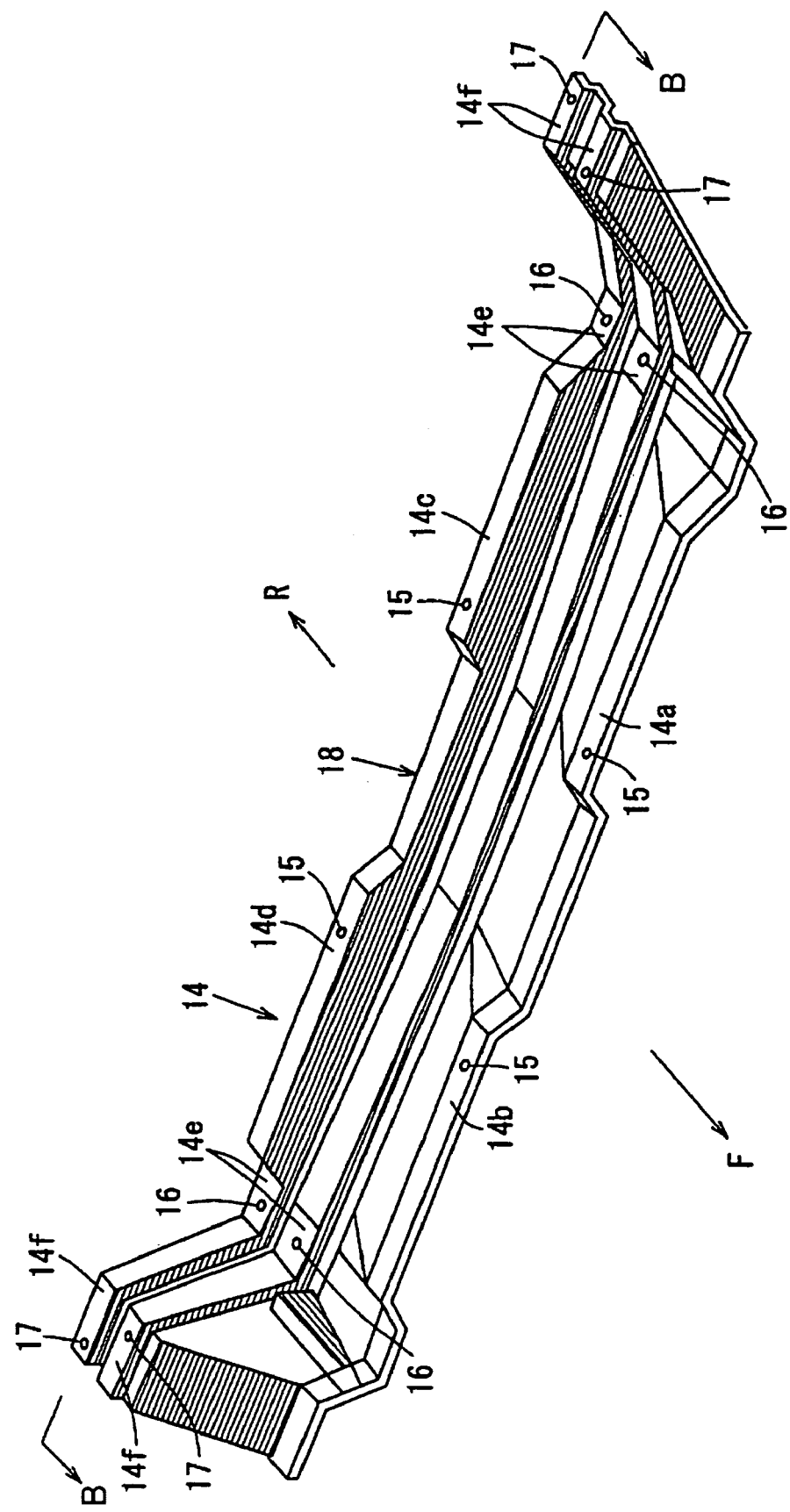
FIG. 7 is a perspective view of the rear cross member.
Figure 8:
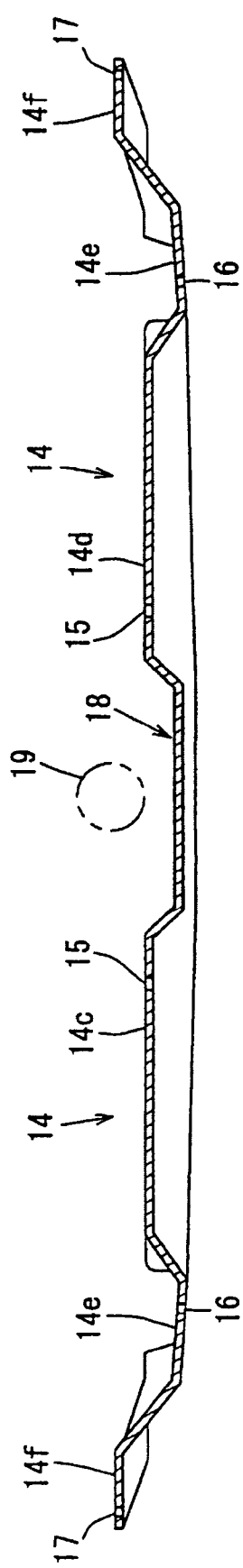
FIG. 8 is a cross-sectional view of the rear cross member taken along lines B-B of FIG. 7.

FIG. 7 is a perspective view of the rear cross member 14, and FIG. 8 is a cross-sectional view of the rear cross member 14 taken along lines B-B of FIG. 7. As depicted in FIGS. 6 to 8, the rear cross member 14 has corrugations running parallel along the length of rear cross member 14 across the vehicle for increasing the stiffness of the rear cross member 14. There are formed front and rear pairs of left and right fixing seats 14a, 14b, 14c, 14d in the rear cross member 14 for fixing the rear cross member 14 to the bottom surface of the floor panel 2 on both sides of the tunnel 3. In the rear cross member 14, there are also formed front and rear pairs of left and right fixing seats 14e for fixing the rear cross member 14 to bottom surfaces of the rear end portions 10a of the left and right floor frames 10, as well as front and rear pairs of left and right fixing seats 14f for fixing the rear cross member 14 to bottom surfaces of the forward end portions 12a of the left and right rear side frames 12. Further, there are formed fixing holes 15, 16, 17 in these fixing seats 14a, 14b, 14c, 14d, 14e, 14f.

As illustrated in FIGS. 7 and 8, there is formed a recess 18 in the rear cross member 14. Positioned below a top surface of the rear cross member 14, the recess 18 runs between the left and right fixing seats 14a, 14b at the front and between the left and right fixing seats 14c, 14d at the rear which are located on both sides of the tunnel 3. An exhaust pipe 19 is mounted just above the recess 18.

The recess 18 is formed at a position of the rear cross member 14 where the exhaust pipe 19 runs as stated above. The fixing seats 14e for fixing the rear cross member 14 to the bottom surfaces of the rear end portions 10a of the left and right floor frames 10 are formed at lower positions so that the fixing seats 14e are recessed downward from the top surface of the rear cross member 14. On the other hand, a bottom surface of the rear cross member 14 is shaped generally in a flat form without any conspicuous protrusions or hollows between the left and right fixing seats 14e.

Figure 9:
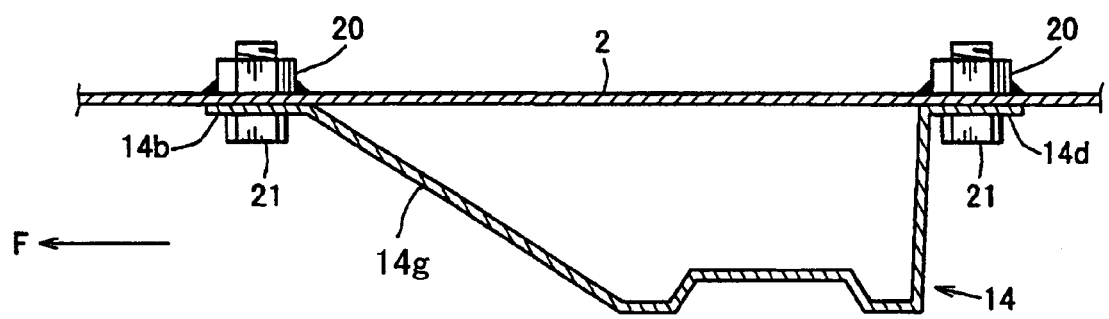
FIG. 9 is a cross-sectional view taken along lines C-C of FIG. 6.

The fixing seats 14f for fixing the rear cross member 14 to the bottom surfaces of the forward end portions 12a of the left and right rear side frames 12 are formed at positions slightly offset rearward from a central main portion of the rear cross member 14. FIG. 9 is a cross-sectional view taken along lines C-C of FIG. 6. As depicted in FIG. 9, multiple nuts 20 are welded to a top surface of the floor panel 2 beforehand at positions corresponding to the fixing holes 15 formed in the rear cross member 14 on both sides of the tunnel 3. Bolts 21 serving as fixing members are tightened into the nuts 20 from underside, whereby the fixing seats 14a, 14b, 14c, 14d are detachably fixed to the floor panel 2.

Figure 10:
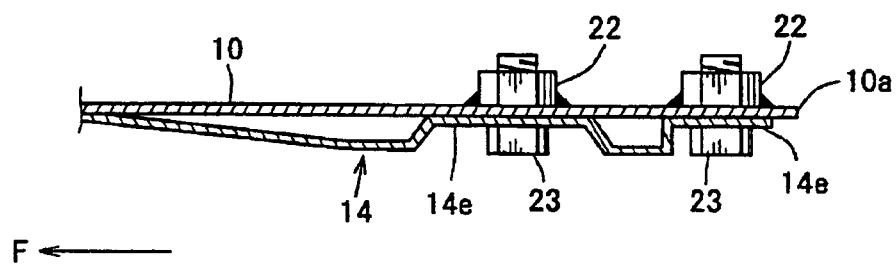
FIG. 10 is a cross-sectional view taken along lines D-D of FIG. 6.

FIG. 10 is a cross-sectional view taken along lines D-D of FIG. 6. As depicted in FIG. 10, multiple nuts 22 are welded to the rear end portions 10a of the left and right floor frames 10 beforehand at positions corresponding to the fixing holes 16 formed in the rear cross member 14. Bolts 23 serving as fixing members are tightened into the nuts 22 from underside, whereby the fixing seats 14e are detachably fixed to the rear end portions 10a of the left and right floor frames 10.

Figure 11:
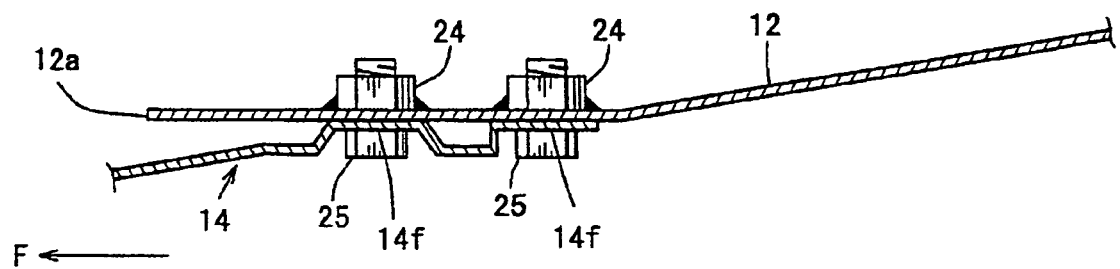
FIG. 11 is a cross-sectional view taken along lines E-E of FIG. 6.

FIG. 11 is a cross-sectional view taken along lines E-E of FIG. 6. As depicted in FIG. 11, multiple nuts 24 are welded to the forward end portions 12a of the left and right rear side frames 12 at positions corresponding to the fixing holes 17 formed in the rear cross member 14. Bolts 25 serving as fixing members are tightened into the nuts 22 from underside, whereby the fixing seats 14f are detachably fixed to the forward end portions 12a of the left and right rear side frames 12.

Figure 12:
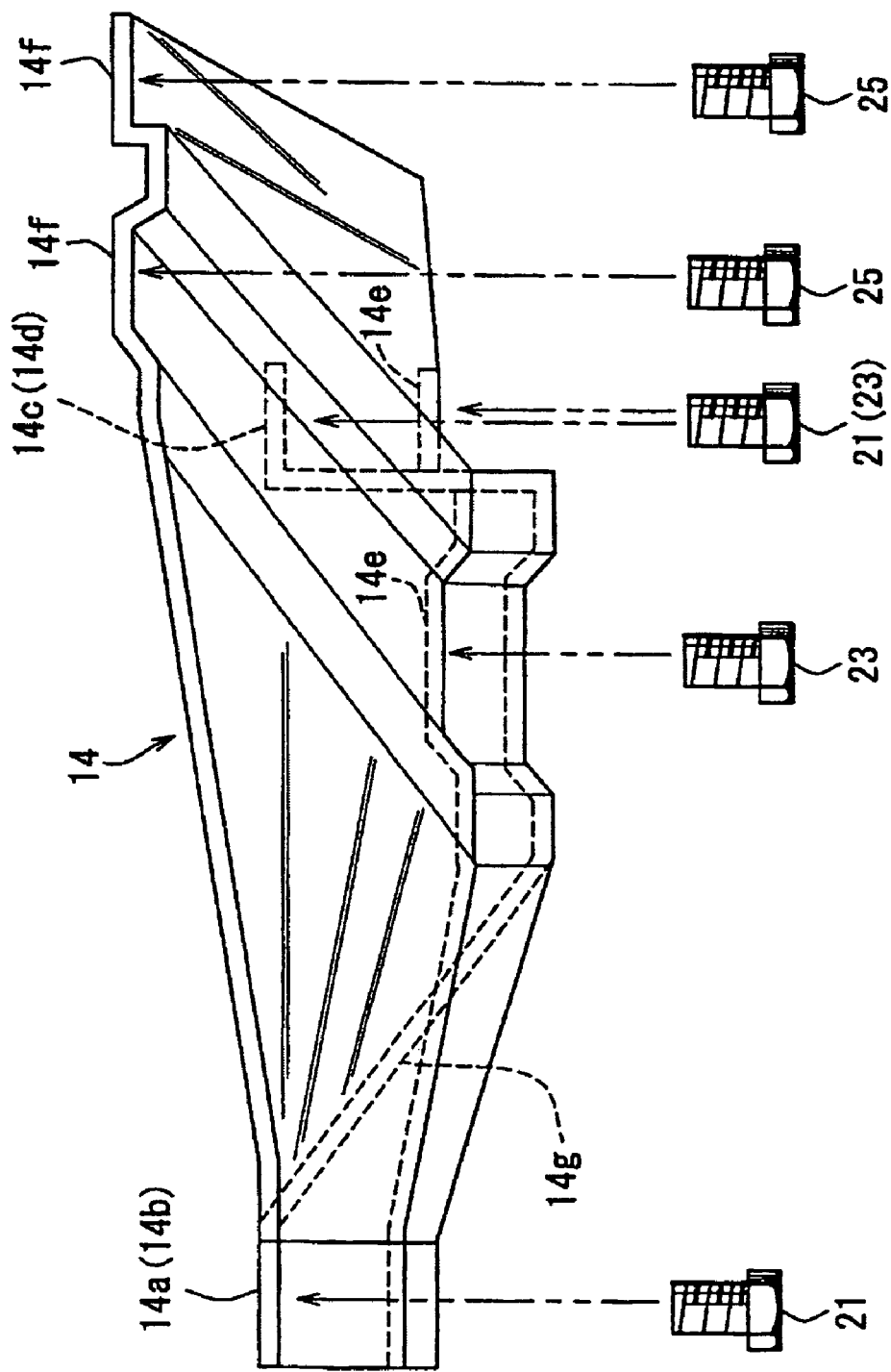
FIG. 12 is an enlarged side view of the rear cross member.

As illustrated also in FIG. 12, the rear cross member 14 is detachably fixed to the floor panel 2 on both sides of the tunnel 3 as well as to the rear end portions 10a of the left and right floor frames 10 and the forward end portions 12a of the left and right rear side frames 12 by the multiple bolts 21, 23, 25 (a total of 12 bolts in the present embodiment) as discussed above. The rear cross member 14 is fixed in this fashion taking into consideration ease of maintenance of the vehicle.

Furthermore, a forward portion of the rear cross member 14 is shaped to form a fairing 14g as illustrated in FIGS. 4 and 9. Extending obliquely downward from the bottom surface of the floor panel 2 rearward, the fairing 14g has a shape suited for regulating flows of wind x. The rear cross member 14 thus shaped constitutes an air deflector for streamlining the flows of the wind x directed toward the fuel tank 13, so that the rear cross member 14 serves also as a fuel tank guard for protecting the fuel tank 13.

Figure 13:
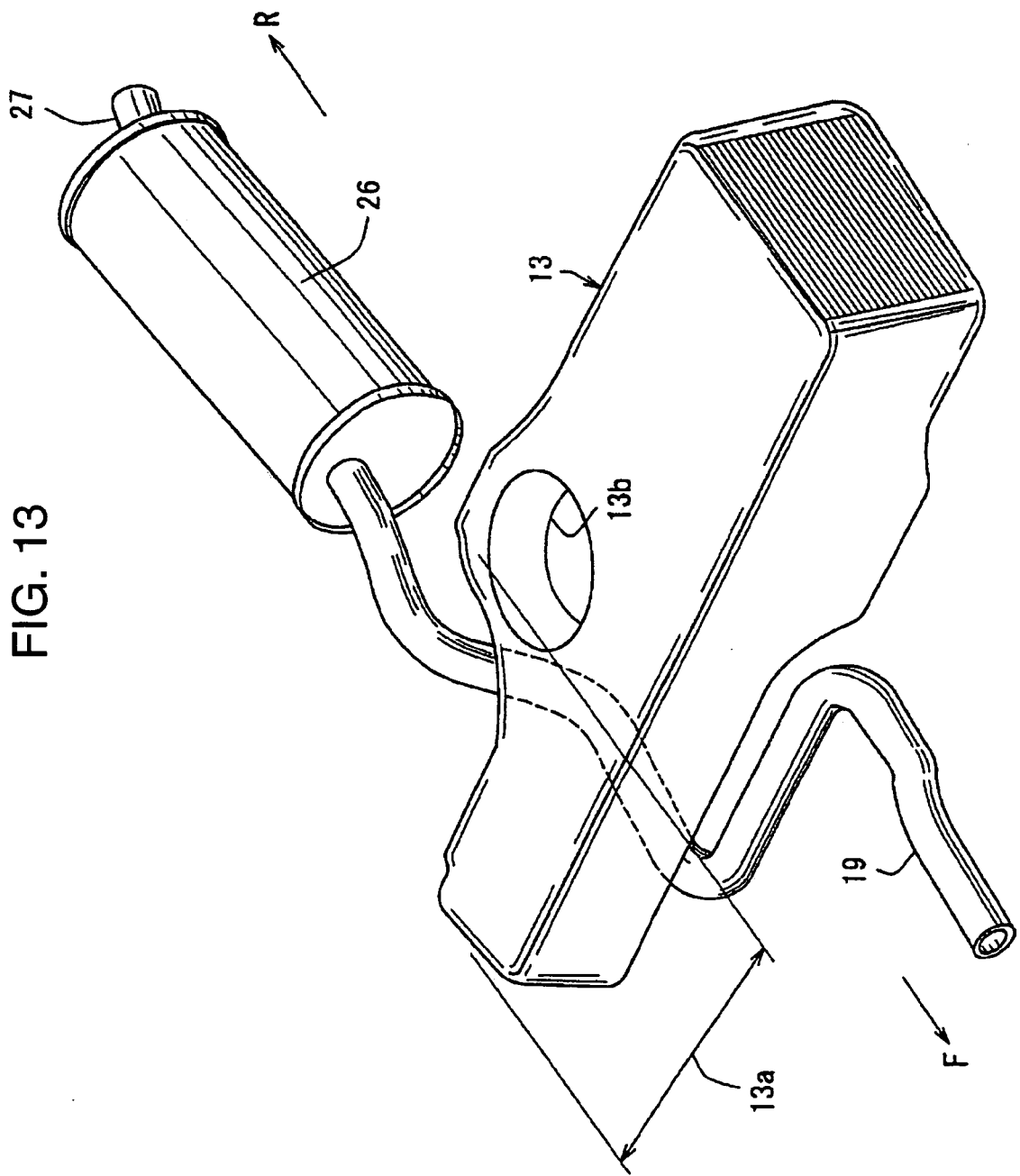
FIG. 13 is a perspective view showing how a fuel tank and an exhaust pipe are arranged.

As shown in FIGS. 5 and 13, the exhaust pipe 19 extending generally along the longitudinal axis of the vehicle runs on one side of the fuel tank 13 under the rear floor 6, the fuel tank 13 extending sideways in part into a space between the exhaust pipe 19 and the rear floor 6. More specifically, the fuel tank 13 has as an integrally extended part 13a which is positioned between an upper part of the generally L-shaped exhaust pipe 19 and the bottom of the rear floor 6. This configuration of the embodiment serves to increase the capacity of the fuel tank 13.

A downstream end of the exhaust pipe 19 connects to a tail pipe 27 via a silencer 26. On the other hand, an upstream end of the exhaust pipe 19 connects to an exhaust manifold (not shown) of an engine via catalytic converters 28, 29 which are located under the tunnel 3 outside the vehicle interior.

Figure 14:
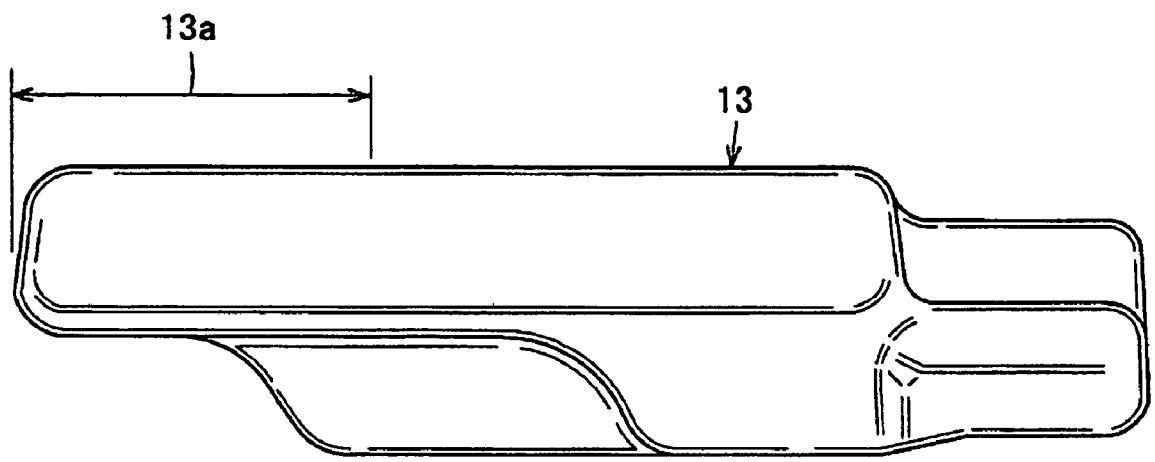
FIG. 14 is a front view of the fuel tank.

In this embodiment, there is formed a recess 13b in the top of the fuel tank 13 and there is formed a recess 6b in the rear floor 6 at a corresponding position as shown in FIG. 4. In one variation of the embodiment, these recesses 6b, 13b may be eliminated as shown in FIG. 14 so that the capacity of the fuel tank 13 is increased by a corresponding amount.

Figure 15:
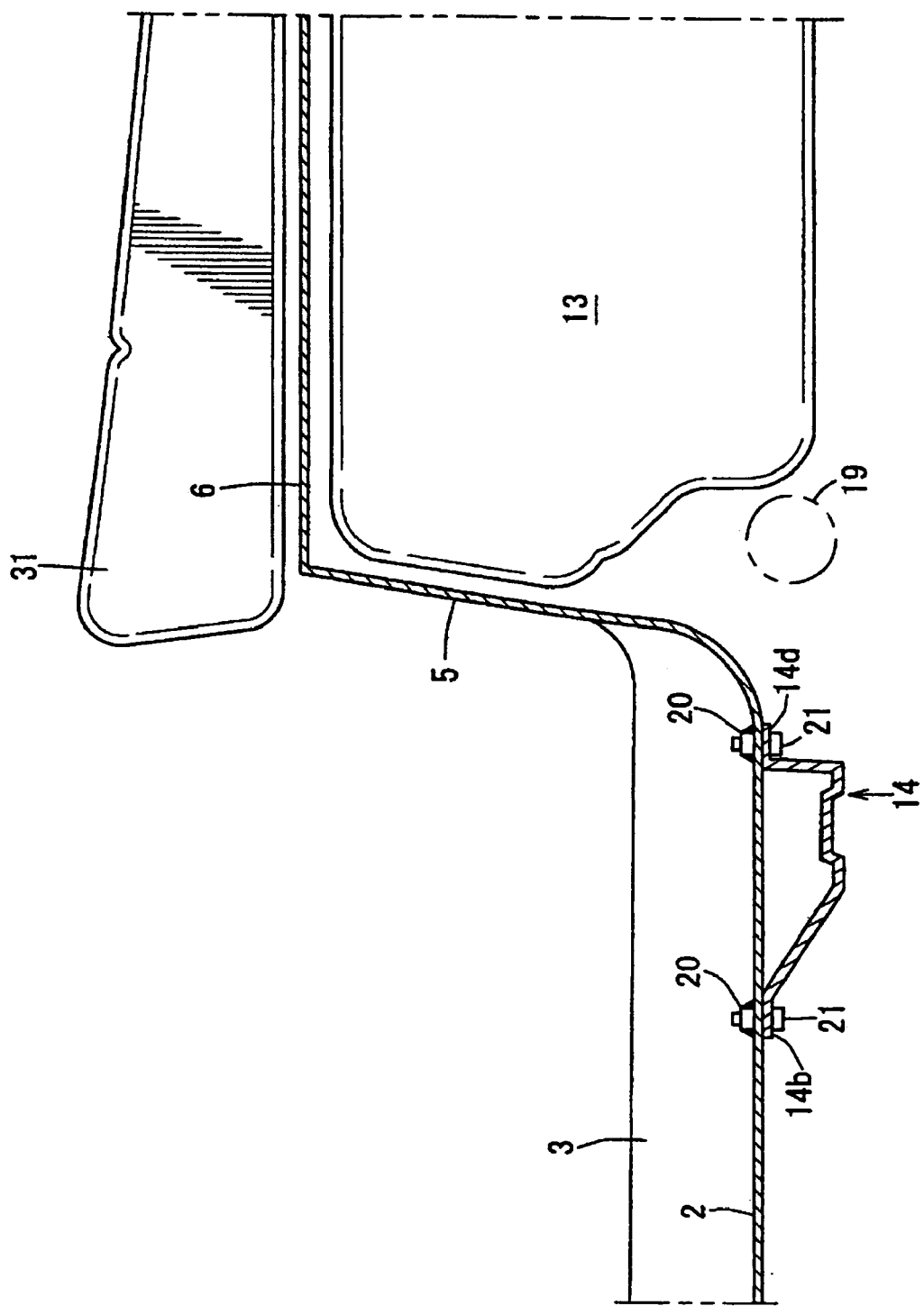
FIG. 15 is a side view showing a rear portion of the underbody structure.

In this embodiment, there is provided a lower tunnel member 30 at a downward-directed opening of the tunnel 3 at a location corresponding to the cross member 8 (or the so-called No. 2 cross member) as shown in FIG. 5. Further, a rear seat 31 is mounted on top of the rear floor 6 close to the kick-up part 5 as shown in FIG. 15.

As thus far described with reference to the specific embodiment, an underbody structure of a vehicle in one principal feature of the invention includes a floor panel (including the floor panel 2 and the rear floor 6), a pair of left and right rear frames (rear side frames 12) extending generally along a longitudinal axis of the vehicle at the rear of the floor panel 2 with a specific distance held between the left and right rear frames across the vehicle, and a cross member (rear cross member 14) extending widthwise across the vehicle and interconnecting forward end portions of the left and right rear frames, wherein the aforementioned fuel tank 13 is mounted between the left and right rear frames, and the cross member is located under the floor panel 2 at the front of the fuel tank 13. The aforementioned cross member serves to provide adequate stiffness of the vehicle body.

Figure 16:
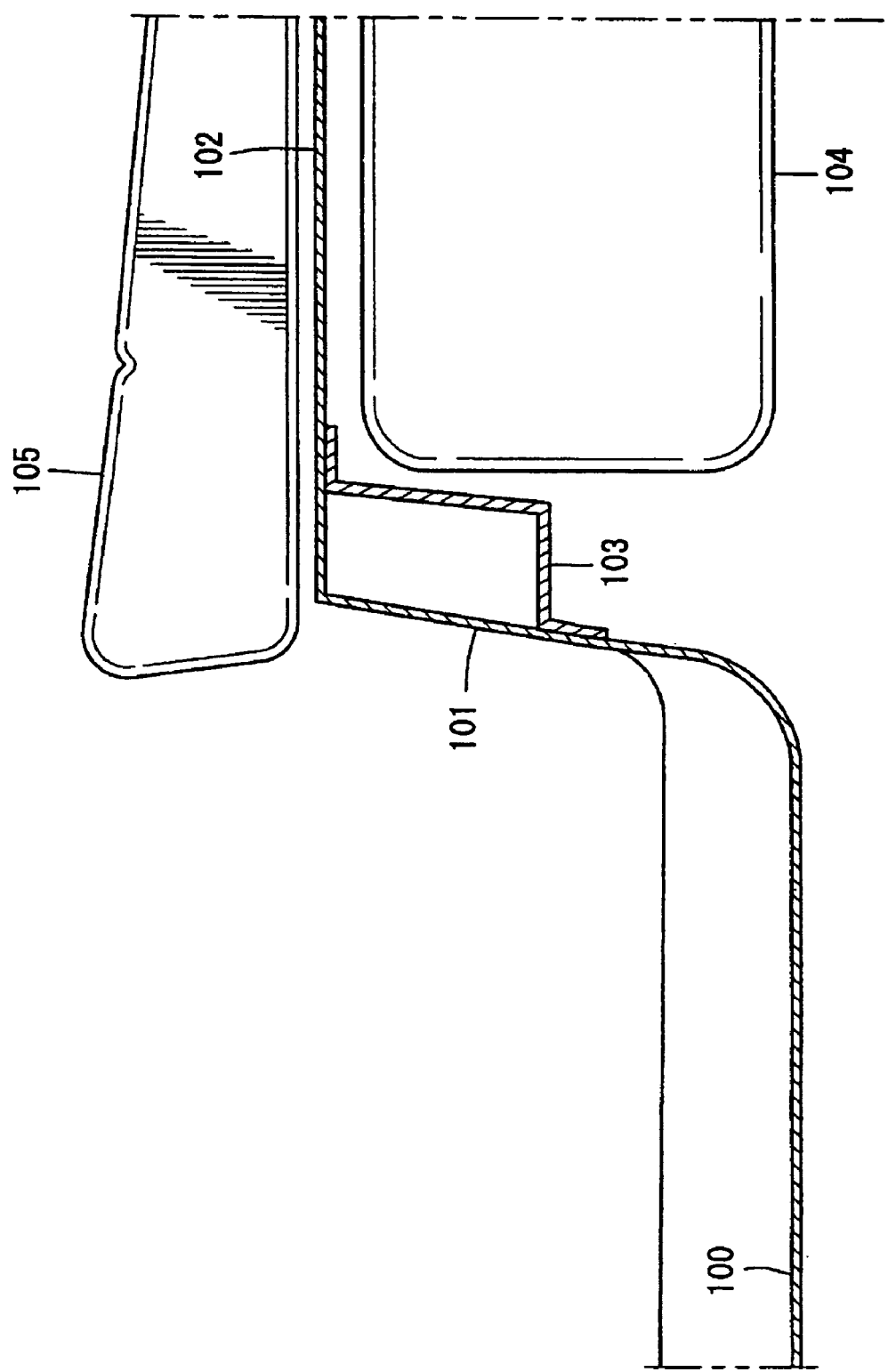
FIG. 16 is a side view showing a conventional underbody structure of a vehicle.

In addition, since the aforementioned cross member (rear cross member 14) is located under the floor panel 2 at the front of the fuel tank 13, the underbody structure of the invention makes it possible to increase the capacity of the fuel tank 13 compared to the earlier-described conventional underbody structure (refer to FIG. 16) in which a rear cross member is installed at the rear of an upper portion of a kick-up part. Therefore, the underbody structure of the invention can satisfy the conventionally conflicting requirements for enhanced vehicle body stiffness and an increased fuel tank capacity at the same time. Furthermore, since the aforementioned cross member (rear cross member 14) is located under the floor panel 2, the presence of the cross member (rear cross member 14) does not adversely affect the vehicle interior in any way.

In the foregoing embodiment, a rear portion of the floor panel 2 is raised to form the kick-up part 5 at a position behind the aforementioned rear cross member 14, and the fuel tank 13 is located slightly below the kick-up part 5. Since the rear cross member 14 is located under the floor panel 2 at the front of the fuel tank 13, the underbody structure of the embodiment can satisfy the conflicting requirements for an increased interior space of the vehicle by locating the kick-up part 5 rearward and an increased fuel tank capacity at the same time.

In the foregoing embodiment, the exhaust pipe 19 extending generally along the longitudinal axis of the vehicle runs on one side of the fuel tank 13 under the floor panel (rear floor 6), and the fuel tank 13 has as the integrally extended part 13a which is positioned between the exhaust pipe 19 and the floor panel (rear floor 6). This construction is advantageous in that it is possible to further increase the capacity of the fuel tank 13 with the provision of the extended part 13a thereof while permitting a well-organized layout of the exhaust pipe 19.

In the foregoing embodiment, the recess 18 is formed at a position of the rear cross member 14 where the exhaust pipe 19 runs as shown in FIGS. 7 and 8. The underbody structure thus constructed can satisfy the conflicting requirements for enhanced vehicle body stiffness and an increased fuel tank capacity at the same time. In addition, this construction is advantageous in that it is possible to effectively enhance ease of layout of the exhaust pipe 19 with the provision of the recess 18.

In the foregoing embodiment, middle parts of the rear cross member 14 are connected to the rear end portions 10a of the floor frames 10 extending parallel to the longitudinal axis of the vehicle along the floor panel 2. In the underbody structure thus constructed, the rear cross member 14 are connected to the individual floor frames 10, together producing a combined reinforcement effect which makes it possible to increase the stiffness of both the rear cross member 14 and the floor frame pair 10. This construction also makes it possible to distribute an impact load occurring in the event of a collision, thereby improving impact resistance of the vehicle.

In the foregoing embodiment, the bottom of the fuel tank 13 extends downward below a lowermost surface of the floor panel 2, and the rear cross member 14 extends down to a position lower than the bottom of the fuel tank 13, forming a fuel tank guard 14tg. This construction makes it possible to effectively increase the capacity of the fuel tank 13 while providing protection therefor.

More specifically, it would be possible to increase the capacity of the fuel tank 13 located behind the kick-up part 5 if the bottom of the fuel tank 13 is lowered down to a position lower than the lowermost surface of the floor panel 2. If the bottom of the fuel tank 13 is simply lowered, however, it is not possible to protect the fuel tank 13 from impact potentially caused by external obstacles hitting against the fuel tank 13. For this reason, the rear cross member 14 is shaped and positioned at the front of the fuel tank 13 in such a fashion that the rear cross member 14 extends down to a position lower than the bottom of the fuel tank 13 in the foregoing embodiment, whereby the rear cross member 14 serves as a fuel tank guard. This construction makes it possible to increase the capacity of the fuel tank 13 while providing protection therefor.

In the foregoing embodiment, the aforementioned rear cross member 14 is formed into a shape suited for regulating flows of wind, whereby the rear cross member 14 constitutes an air deflector for streamlining the wind flows as depicted in FIG. 4, for instance. This construction serves to increase the capacity of the fuel tank 13 and improve aerodynamic properties of the underbody structure in surrounding areas of the fuel tank 13. More specifically, if the fuel tank 13 is located behind the kick-up part 5 as stated above, there is formed an open space in the vicinity of the fuel tank 13, making a surrounding area of the fuel tank 13 more complex. If the wind blows into such a complex area, the wind flows become disturbed, resulting in the occurrence of eddies which cause an adverse effect to aerodynamic drag of the underbody structure of the vehicle. The provision of the aforementioned air deflector (rear cross member 14) on the bottom of the floor panel 2 at the front of the fuel tank 13 for streamlining the wind flows directed toward the fuel tank 13 serves to prevent the occurrence of such eddies and improve the aerodynamic properties of the underbody structure in the surrounding areas of the fuel tank 13.

In the foregoing embodiment, the aforementioned rear cross member 14 is detachably mounted under the floor panel 2. This is advantageous in that serviceability is ensured for the exhaust pipe 19. More specifically, this construction makes it possible to easily remove the rear cross member 14 from the vehicle body and offers improved serviceability by enabling easy inspection and maintenance of the exhaust pipe 19 which requires frequent servicing.

In the foregoing embodiment, the aforementioned rear cross member 14 is bolted to the forward end portions 12a of the left and right rear side frames 12. As the rear cross member 14 is bolted to the left and right rear side frames 12 which serve as body stiffening members, each forming a closed cross section, it is possible to increase the stiffness of both the rear cross member 14 and the pair of the rear side frames 12 as well as supporting stiffness (joint strength) of the rear cross member 14. In addition, this construction allows for easy removal of the rear cross member 14, thereby offering improved serviceability of the exhaust pipe 19.

In the foregoing embodiment, the aforementioned rear cross member 14 is bolted to the floor panel 2. As the rear cross member 14 is bolted to the floor panel 2, it is possible to increase the stiffness of both the rear cross member 14 and the floor panel 2 as well as the supporting stiffness of the rear cross member 14. In addition, this construction allows for easy removal of the rear cross member 14, thereby offering improved serviceability of the exhaust pipe 19.

In the foregoing embodiment, the aforementioned rear cross member 14 is further bolted to both sides of the fuel tank 13 which has a particularly high strength in the floor panel 2. As the rear cross member 14 is bolted to both sides of the fuel tank 13, it is possible to increase the stiffness of both the rear cross member 14 and the tunnel 3 as well as the supporting stiffness (joint strength) of the rear cross member 14 even more. In addition, this construction allows for easy removal of the rear cross member 14, thereby offering improved serviceability of the exhaust pipe 19.

In the foregoing embodiment, the aforementioned rear cross member 14 is bolted to the rear end portions 10a of the left and right floor frames 10. As the rear cross member 14 is bolted to the left and right floor frames 10 which serve as body stiffening members, each forming a closed cross section extending along the longitudinal axis of the vehicle, it is possible to increase the stiffness of both the rear cross member 14 and the pair of the floor frames 10 as well as supporting stiffness of the rear cross member 14 even more. In addition, this construction allows for easy removal of the rear cross member 14, thereby offering improved serviceability of the exhaust pipe 19.

As thus far described with reference to the specific embodiment, an underbody structure of a vehicle in another principal feature of the invention includes a floor panel (including the floor panel 2 and the rear floor 6), a pair of left and right rear frames (rear side frames 12) extending generally along a longitudinal axis of the vehicle at the rear of the floor panel 2 with a specific distance held between the left and right rear frames across the vehicle, and a cross member (rear cross member 14) extending widthwise across the vehicle and interconnecting forward end portions of the left and right rear frames, wherein the aforementioned fuel tank 13 is mounted between the left and right rear frames, and the cross member is located under the floor panel 2 at the front of the fuel tank 13. In this underbody structure, the bottom of the fuel tank 13 extends downward below a lowermost surface of the floor panel 2, and the rear cross member 14 extends down to a position lower than the bottom of the fuel tank 13, forming a fuel tank guard 14*tg*. Also, the rear cross member 14 is formed into a shape suited for regulating flows of wind, whereby the rear cross member 14 constitutes an air deflector for streamlining the wind flows. The underbody structure thus constructed can satisfy the conventionally conflicting requirements for enhanced vehicle body stiffness and an increased fuel tank capacity at the same time. Also, this construction is advantageous in that the rear cross member 14 serving as the fuel tank guard and the air deflector serves to improve the aerodynamic properties of the underbody structure in the surrounding areas of the fuel tank 13.

More specifically, the aforementioned rear cross member 14 interconnects the forward end portions 12*a* of the left and right rear side frames 12, serving thereby to provide adequate stiffness of the vehicle body. In addition, since the aforementioned rear cross member 14 is located below the rear floor 6 at the front of the fuel tank 13, the underbody structure of the invention makes it possible to increase the capacity of the fuel tank 13 compared to the earlier-described conventional underbody structure in which the cross member is installed at the rear of an upper portion of the kick-up part. Furthermore, since the fuel tank 13 is protected by the rear cross member 14 which serves as the fuel tank guard, it is possible to increase the capacity of the fuel tank 13 while preventing the fuel tank 13 from impact potentially caused by external obstacles hitting against the fuel tank 13. Moreover, the air deflector made by forming the rear cross member 14 into a shape suited for regulating flows of wind streamlines the wind flows directed toward the fuel tank 13. This serves to improve aerodynamic properties of the underbody structure in surrounding areas of the fuel tank 13 while reducing the number of components and man-hours required for assembly.

In summary, as one principal form of the invention, an underbody structure of a vehicle includes a floor panel, a pair of left and right rear frames extending generally along a longitudinal axis of the vehicle at the rear of the floor panel with a specific distance held between the left and right rear frames across the vehicle, and a cross member extending widthwise across the vehicle and interconnecting forward end portions of the left and right rear frames. In this underbody structure, a fuel tank is mounted between the left and right rear frames, and the cross member is located under the floor panel at the front of the fuel tank.

In the underbody structure thus constructed, the aforementioned cross member interconnects the forward end portions of the left and right rear frames across the vehicle, serving thereby to provide adequate stiffness of the vehicle body. In addition, since the aforementioned cross member is located under the floor panel at the front of the fuel tank, the underbody structure of the invention makes it possible to increase the capacity of the fuel tank compared to the earlier-described conventional underbody structure in which the cross member is installed at the rear of an upper portion of the kick-up part. Therefore, the underbody structure of the invention can satisfy the conventionally conflicting requirements for enhanced vehicle body stiffness and an increased fuel tank capacity at the same time. Furthermore, since the aforementioned cross member is located under the floor panel, the presence of the cross member does not adversely affect the vehicle interior in any way.

In one aspect of the invention, the aforementioned floor panel has a kick-up part formed by raising a rear portion of the floor panel at a position behind the aforementioned cross member, and the fuel tank is located on the rear side of the kick-up part.

In this construction, the fuel tank is located on the read of the kick-up part and the cross member is located under the floor panel at the front of the fuel tank, so that the underbody structure can satisfy the conventionally conflicting requirements for an increased interior space of the vehicle by locating the kick-up part rearward and an increased fuel tank capacity at the same time.

In another aspect of the invention, an exhaust pipe extending generally along the longitudinal axis of the vehicle runs on one side of the fuel tank under the floor panel, and the fuel tank has as an integrally extended part which is positioned between the exhaust pipe and the floor panel.

This construction makes it possible to further increase the capacity of the fuel tank by extending part of the fuel tank while permitting a well-organized layout of the exhaust pipe.

In another aspect of the invention, an exhaust pipe extending generally along the longitudinal axis of the vehicle runs on one side of the fuel tank under the aforementioned floor panel, and a recess is formed at a position of the aforementioned cross member where the exhaust pipe runs.

The underbody structure thus constructed can satisfy the conventionally conflicting requirements for enhanced vehicle body stiffness and an increased fuel tank capacity at the same time. In addition, this construction makes it possible to easily lay out the exhaust pipe by using the recess.

In another aspect of the invention, the underbody structure further includes a floor frame extending parallel to the longitudinal axis of the vehicle along the aforementioned floor panel, wherein a middle part of the aforementioned cross member is connected to a rear end portion the floor frame.

In the underbody structure thus constructed, the cross member and the floor frame are connected to each other, together producing a combined reinforcement effect which makes it possible to increase the stiffness of both the cross member and the floor frame. This construction also makes it possible to distribute an impact load occurring in the event of a collision, thereby improving impact resistance of the vehicle.

In another aspect of the invention, the bottom of the fuel tank extends downward below a lowermost surface of the aforementioned floor panel, and the aforementioned cross member extends down to a position lower than the bottom of the fuel tank, forming a fuel tank guard.

This construction makes it possible to increase the capacity of the fuel tank while preventing the fuel tank from impact potentially caused by external obstacles hitting against the fuel tank of which bottom extends downward below the lowermost surface of the floor panel.

In another aspect of the invention, the aforementioned cross member is formed into a shape suited for regulating flows of wind, whereby the cross member constitutes an air deflector for streamlining the wind flows.

In the underbody structure thus constructed, the air deflector made by forming the cross member into a shape suited for regulating flows of wind streamlines the wind flows directed toward the fuel tank. This construction serves to improve aerodynamic properties of the underbody structure in surrounding areas of the fuel tank while reducing the number of components and man-hours required for assembly.

In another aspect of the invention, the aforementioned cross member is detachably mounted under the aforementioned floor panel.

This construction makes it possible to easily remove the cross member from the vehicle body and offers improved serviceability by enabling easy inspection and maintenance of the exhaust pipe, for example.

In another aspect of the invention, the aforementioned cross member is bolted to the forward end portions of the aforementioned rear frames.

In the underbody structure thus constructed, the cross member is bolted to both the left and right rear frames which serve as body stiffening members. This construction makes it possible to increase the stiffness of both the cross member and the rear frame pair. In addition, the construction allows for easy removal of the cross member, thereby offering improved serviceability of the exhaust pipe.

In another aspect of the invention, the aforementioned cross member is bolted to the aforementioned floor panel.

In this construction, the cross member is bolted to the floor panel, so that the stiffness of both the cross member and the floor panel is increased. Also, the construction allows for easy removal of the cross member, thereby offering improved serviceability of the exhaust pipe.

In still another aspect of the invention, the aforementioned cross member is bolted to a tunnel portion of the aforementioned floor panel.

In this construction, the cross member is bolted to the tunnel portion, so that the stiffness of both the cross member and the tunnel portion is increased. Also, the construction allows for easy removal of the cross member, thereby offering improved serviceability of the exhaust pipe.

In yet another aspect of the invention, the aforementioned cross member is bolted to a floor frame extending parallel to the longitudinal axis of the vehicle along the aforementioned floor panel.

In the underbody structure thus constructed, the cross member is bolted to the floor frame which serves as a body stiffening member. This construction makes it possible to increase the stiffness of both the cross member and the floor frame. In addition, the construction allows for easy removal of the cross member, thereby offering improved serviceability of the exhaust pipe.

In another principal form of the invention, an underbody structure of a vehicle includes a floor panel, a pair of left and right rear frames extending generally along a longitudinal axis of the vehicle at the rear of the floor panel with a specific distance held between the left and right rear frames across the vehicle, and a cross member extending widthwise across the vehicle and interconnecting forward end portions of the left and right rear frames. In this underbody structure, a fuel tank is mounted between the left and right rear frames, the cross member is located under the floor panel at the front of the fuel tank, the bottom of the fuel tank extends downward below a lowermost surface of the floor panel, the cross member extends down to a position lower than the bottom of the fuel tank, forming a fuel tank guard, and the cross member is formed into a shape suited for regulating flows of wind, whereby the cross member constitutes an air deflector for streamlining the wind flows.

In the underbody structure thus constructed, the aforementioned cross member interconnects the forward end portions of the left and right rear frames across the vehicle, serving thereby to provide adequate stiffness of the vehicle body. In addition, since the aforementioned cross member is located under the floor panel at the front of the fuel tank, the underbody structure of the invention makes it possible to increase the capacity of the fuel tank compared to the earlier-described conventional underbody structure in which the cross member is installed at the rear of an upper portion of the kick-up part. Furthermore, since the fuel tank is protected by the cross member which serves as the fuel tank guard, it is possible to increase the capacity of the fuel tank while preventing the fuel tank from impact potentially caused by external obstacles hitting against the fuel tank. Moreover, the air deflector made by forming the cross member into a shape suited for regulating flows of wind streamlines the wind flows directed toward the fuel tank. This serves to improve aerodynamic properties of the underbody structure in surrounding areas of the fuel tank while reducing the number of components and man-hours required for assembly.

Since the cross member extending widthwise across the vehicle and interconnecting the forward end portions of the left and right rear frames is located under the floor panel at the front of the fuel tank, the underbody structure of the invention can satisfy the requirements for enhanced vehicle body stiffness and an increased fuel tank capacity at the same time.

In the appended claims of this invention, the floor panel 2 and the rear floor 6 of the foregoing embodiment are referred to together as a floor frame, the rear side frames 12 are referred to as rear frames, and the rear cross member 14 is referred to as a cross member. It should be apparent for those skilled in the art that the invention is not limited to the foregoing embodiment but may be practiced in various ways within the scope of the appended claims.

This application is based on Japanese Patent Application Serial Nos. 2004-192476, 2004-192477, 2004-201295, and 2004-201296, filed in Japan Patent Office on Jun. 30, 2004, Jun. 30, 2004, Jul. 8, 2004, and Jul. 8, 2004, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An underbody structure of a vehicle comprising:
a floor having a kick-up part formed by raising a rear portion of said floor panel;
a pair of left and right rear frames extending generally along a longitudinal axis of the vehicle at the rear part of said floor panel with a specific distance held between said left and right rear frames across the vehicle; and
a cross member extending widthwise across the vehicle and interconnecting forward end portions of said left and right rear frames;
wherein a fuel tank is mounted between said left and right rear frames, and said cross member is located under said floor panel at the front of the fuel tank, wherein the cross member is provided in front and in close proximity of the kick-up part, wherein an exhaust pipe extends generally along the longitudinal axis of the vehicle under said floor panel, said exhaust pipe having a portion running on one side of the fuel tank, and the fuel tank has an integrally extended part which is positioned between said exhaust pipe and said floor panel.

2. An underbody structure of a vehicle comprising:
a floor having a kick-up part formed by raising a rear portion of said floor panel;
a pair of left and right rear frames extending generally along a longitudinal axis of the vehicle at the rear part of said floor panel with a specific distance held between said left and right rear frames across the vehicle; and
a cross member extending widthwise across the vehicle and interconnecting forward end portions of said left and right rear frames;
wherein a fuel tank is mounted between said left and right rear frames, and said cross member is located under said floor panel at the front of the fuel tank, wherein the cross member is provided in front and in close proximity of the kick-up part; and
a floor frame extending parallel to the longitudinal axis of the vehicle along said floor panel, wherein portions near opposite ends of said cross member are connected to a rear end portion of said floor frame.

3. An underbody structure of a vehicle comprising:
a floor having a kick-up part formed by raising a rear portion of said floor panel;
a pair of left and right rear frames extending generally along a longitudinal axis of the vehicle at the rear part of said floor panel with a specific distance held between said left and right rear frames across the vehicle; and
a cross member extending widthwise across the vehicle and interconnecting forward end portions of said left and right rear frames;
wherein a fuel tank is mounted between said left and right rear frames, and said cross member is located under said floor panel at the front of the fuel tank, wherein the cross member is provided in front and in close proximity of the kick-up part, wherein the bottom of the fuel tank extends downward below a lowermost surface of said floor panel, and said cross member extends down to a position lower than the bottom of the fuel tank, forming a fuel tank guard.

4. The underbody structure according to claim 3, wherein said cross member is formed into a shape suited for regulating flows of wind, whereby said cross member constitutes an air deflector for streamlining the wind flows.

5. An underbody structure of a vehicle comprising:
a floor having a kick-up part formed by raising a rear portion of said floor panel;
a pair of left and right rear frames extending generally along a longitudinal axis of the vehicle at the rear part of said floor panel with a specific distance held between said left and right rear frames across the vehicle; and
a cross member extending widthwise across the vehicle and interconnecting forward end portions of said left and right rear frames;
wherein a fuel tank is mounted between said left and right rear frames, and said cross member is located under said floor panel at the front of the fuel tank, wherein the cross member is provided in front and in close proximity of the kick-up part, wherein said cross member is detachably mounted under said floor panel, wherein said cross member is bolted to a tunnel portion formed on said floor panel.

6. An underbody structure of a vehicle comprising:
a floor having a kick-up part formed by raising a rear portion of said floor panel;
a pair of left and right rear frames extending generally along a longitudinal axis of the vehicle at the rear part of said floor panel with a specific distance held between said left and right rear frames across the vehicle; and
a cross member extending widthwise across the vehicle and interconnecting forward end portions of said left and right rear frames;
wherein a fuel tank is mounted between said left and right rear frames, and said cross member is located under said floor panel at the front of the fuel tank, wherein the cross member is provided in front and in close proximity of the kick-up part, wherein said cross member is detachably mounted under said floor panel, wherein said cross member is bolted to a floor frame extending parallel to the longitudinal axis of the vehicle along said floor panel.

7. An underbody structure of a vehicle comprising:
a floor having a kick-up part formed by raising a rear portion of said floor panel;
a pair of left and right rear frames extending generally along a longitudinal axis of the vehicle at the rear part of said floor panel with a specific distance held between said left and right rear frames across the vehicle; and
a cross member extending widthwise across the vehicle and interconnecting forward end portions of said left and right rear frames;
wherein a fuel tank is mounted between said left and right rear frames, and said cross member is located under said floor panel at the front of the fuel tank, and
wherein the cross member is provided in front and in close proximity of the kick-up part; and
wherein a fixing seat is provided to said cross member at opposite ends thereof and said fixing seat extends further rearward than the main part of the cross member and said fixing seat is fixed to the corresponding frontal end of the rear side frame.

8. The underbody structure according to claim 7, wherein said cross member is detachably mourned under said floor panel.

9. The underbody structure according to claim 7, wherein said cross member is bolted to the forward end portions of said rear frames.

10. The underbody structure according to claim 7, wherein said cross member is bolted to said floor panel.

11. The underbody structure according to claim 7, wherein said fixing seat is fixed to the bottom surface of the rear side frame.

12. The underbody structure according to claim 7, wherein said rear side frame has a closed cross section on a plane dissecting said side frame in a widthwise direction.

* * * * *